US008663468B2

(12) United States Patent
Gommel et al.

(10) Patent No.: US 8,663,468 B2
(45) Date of Patent: Mar. 4, 2014

(54) REACTOR FOR ANAEROBIC PURIFICATION OF WASTE WATER INCLUDING MULTI-PHASE SEPARATOR DEVICES

(75) Inventors: Axel Gommel, Ravensburg (DE); Dieter Efinger, Kumhausen (DE); Ronald Mulder, Aklmaar (NL)

(73) Assignees: Voith Patent GmbH, Heidenheim (DE); Aquatyx Wassertechnik GmbH, Ravensburg (DE)

( * ) Notice: Subject to any disclaimer, the term of this patent is extended or adjusted under 35 U.S.C. 154(b) by 0 days.

(21) Appl. No.: 13/369,422

(22) Filed: Feb. 9, 2012

(65) Prior Publication Data

US 2013/0037468 A1 Feb. 14, 2013

Related U.S. Application Data

(63) Continuation of application No. PCT/EP2010/059953, filed on Jul. 12, 2010.

(30) Foreign Application Priority Data

Aug. 18, 2009 (DE) .......................... 10 2009 037 953

(51) Int. Cl.
  *C02F 3/28* (2006.01)
  *C02F 11/04* (2006.01)
(52) U.S. Cl.
  USPC ............ 210/188; 210/260; 210/928; 210/603
(58) Field of Classification Search
  USPC ................................. 210/603, 188, 260, 928
  See application file for complete search history.

(56) References Cited

U.S. PATENT DOCUMENTS

| | | | | |
|---|---|---|---|---|
| 5,013,431 A | * | 5/1991 | Doets ........................... | 210/188 |
| 6,309,553 B1 | | 10/2001 | Lanting et al. | |
| 8,043,506 B2 | * | 10/2011 | Frankin et al. ................ | 210/603 |
| 2002/0000409 A1 | * | 1/2002 | Lanting et al. ................ | 210/603 |

FOREIGN PATENT DOCUMENTS

| | | |
|---|---|---|
| CN | 101 164 915 A | 4/2008 |
| DE | 10 2004 021 022 B3 | 10/2005 |
| DE | 10 2006 032 489 A1 | 1/2008 |
| EP | 0 170 332 A1 | 2/1986 |
| EP | 0 493 727 A1 | 7/1992 |
| EP | 0 808 805 A1 | 11/1997 |
| EP | 1 071 636 B1 | 1/2002 |
| JP | 11 290887 A | 10/1999 |
| WO | 2004/035485 A1 | 4/2004 |
| WO | 2007/048537 A1 | 5/2007 |

OTHER PUBLICATIONS

Machine-generated English translation of JP 11-290887. Printed Apr. 20, 2013.*
Machine-generated English translation of WO 2007/048537. Printed Apr. 20, 2013.*
International Search Report dated Dec. 2, 2010 for International Patent Application No. PCT/EP2010/059953 (6 pages).

* cited by examiner

*Primary Examiner* — Fred Prince
(74) *Attorney, Agent, or Firm* — Taylor IP, P.C.

(57) ABSTRACT

A reactor for anaerobically purifying waste water, such as waste water from the paper industry, includes a reactor vessel that has at least one inlet for supplying waste water to be purified into the reactor, at least one outlet for discharging purified water, at least one sediment filter and at least two multi-phase separator devices arranged on top of one another.

26 Claims, 4 Drawing Sheets

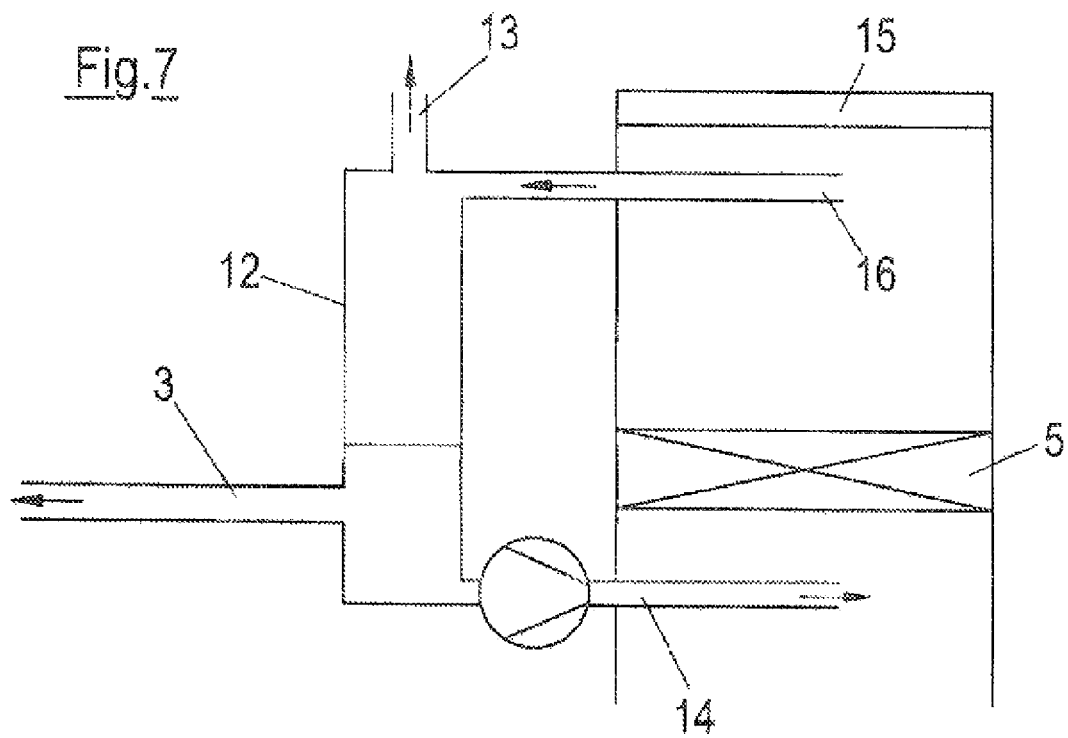
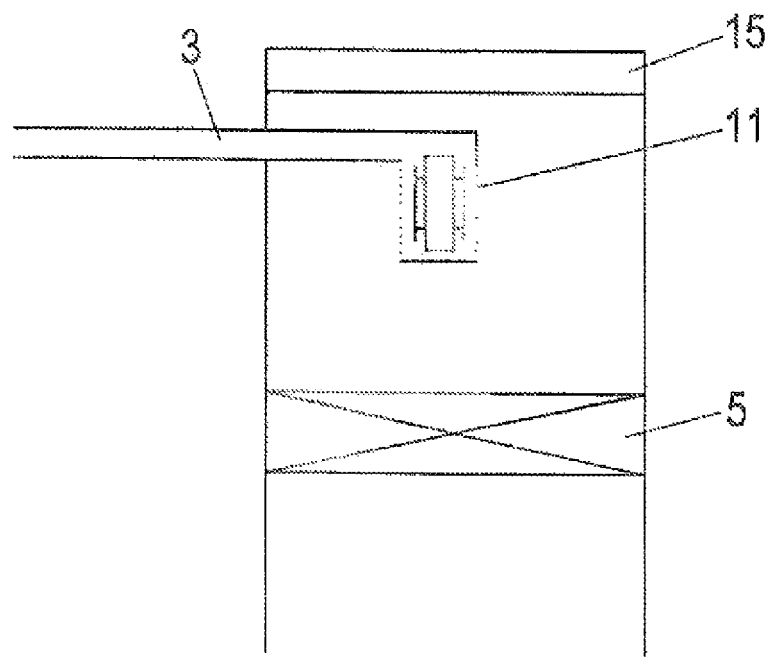

REACTOR FOR ANAEROBIC PURIFICATION OF WASTE WATER INCLUDING MULTI-PHASE SEPARATOR DEVICES

CROSS REFERENCE TO RELATED APPLICATIONS

This is a continuation of PCT Application No. PCT/EP2010/059953, entitled "REACTOR FOR AN ANAEROBICALLY PURIFYING WASTE WATER COMPRISING MULTI-PHASE SEPARATOR DEVICES", filed Jul. 12, 2010, which is incorporated herein by reference.

BACKGROUND OF THE INVENTION

1. Field of the Invention

The present invention relates to a reactor for anaerobic purification of waste water, particularly waste water from the paper industry, including a reactor vessel that has at least one inlet for supplying waste water to be purified into the reactor, at least one outlet for discharging purified water, at least one sediment drain and at least two multi-phase separator devices arranged on top of one another.

2. Description of the Related Art

A multitude of mechanical, chemical and biological methods and corresponding reactors are known for purification of waste water. In biological waste water purification, the waste water to be purified is brought into contact with aerobic or anaerobic micro-organisms which, in the case of aerobic micro-organisms decompose organic contaminants contained in the waste water predominantly to carbon dioxide, biomass and water, and in the case of anaerobic micro-organisms mainly to carbon dioxide and methane and only in small part to biomass.

In recent times the biological waste water purification methods are hereby carried out increasingly with anaerobic micro-organisms, since with the anaerobic waste water purification oxygen does not have to be supplied into the bioreactor at a high energy expenditure; energy-rich biogas is produced during purification which can subsequently be utilized for generating energy; and substantially lower volumes of excess sludge are produced.

Depending on the type and form of the utilized biomass, the reactors for anaerobic waste water purification are categorized into contact sludge reactors, UASB-reactors, EGSB-reactors, fixed bed reactors and fluidized bed reactors.

Whereas the micro-organisms in fixed bed reactors adhere to stationary carrier materials and the micro-organisms in fluidized bed reactors adhere to freely moving, small carrier material; the micro-organisms in UASB and EGSB reactors are utilized in the form of so-called pellets. In contrast to UASB (upflow anaerobic sludge bed) reactors, EGSB (expanded granular sludge bed) reactors are higher and at the same volume have a substantially smaller base surface.

In the case of UASB and EGSB reactors, waste water which is to be purified, or a mixture of waste water which is to be purified and already purified waste water from the outlet of the anaerobic reactor is fed continuously to the reactor through an inlet which is arranged in the lower region of the reactor and is directed through a micro-organism pellet-containing sludge bed which is located above the inlet.

During decomposition of the organic compounds from the waste water, the micro-organisms form in particular methane and carbon dioxide containing gas (which is also referred to as biogas) which partially adheres to the micro-organism pellets in the form of small bubbles and which partially rises to the top in the reactor in the form of free gas bubbles. Because of the added gas bubbles the specific weight of the pellets decreases, which is the reason that the pellets rise to the top in the reactor. In order to separate the formed biogas and the rising pellets from the water, separators are arranged in the center and/or upper part of the reactor, mostly in the embodiment of gas hoods under the top of which biogas accumulates, forming a gas cushion, under which a flotation layer consisting of micro-organism pellets and waste water is disposed. Purified water, relieved of gas and micro-organism pellets rises upwards in the reactor and is drawn off at the upper end of the reactor through overflows. Methods of this type and associated reactors are described for example from EP 0 170 332 A and EP 1 071 636 B.

In heavy duty reactors for anaerobic waste water treatment normally 2 three-phase separator devices are used. These consist of gas collector hoods which are arranged offset on top of one another, beneath which rising biogas bubbles and rising granular bio-sludge (pellets) accumulates. As already mentioned, the gas is removed from the hoods. The granulated biomass either eliminates gas adhering to it and sinks then again to the reactor bottom or is transported in the form of a gas/water/pellet mixture through a pipe system in a gas separator device on the reactor head where it is subjected to shearing forces. Due to this the gas separates from the biomass, and the granular sludge is returned into the process. The upper three-phase separator device normally also forms the roof of the reactors.

What is needed in the art is to improve the capacity of the reactor with as little effort as possible.

SUMMARY OF THE INVENTION

The present invention provides a reactor for anaerobic purification of waste water which includes at least two multi-phase separator devices which are configured differently. The configuration of the multi-phase separator devices can hereby be better adapted to the conditions at the installation location in the reactor vessel, as well as to the particular functions associated herewith.

According to the reactor of the present invention, the function of the lower multi-phase separator device which seals the heavy duty region is, for example, to separate the bulk of the developing biogas. Here it must be ensured that the occurring gas volumes are captured and that the gas/sludge/water mixture is securely fed into the internal circulation loop. The internal re-circulation loop consists of a mammoth pump which delivers into the gas separator device on the reactor head. From there the separated gas/water mixture is again admitted through a downpipe into the region below the lower multi-phase separator device.

The upper multi-phase separator device is required to primarily ensure that no granular biomass is discharged with the clarified water. It is not connected to the internal re-circulation loop. Separated granular biomass is therefore generally returned into the process exclusively through sedimentation. If the chamber above the suspension is designed to be gas-impervious, then separate capturing of gas is not necessary, since the gas will be admitted into this collection chamber under its own accord.

Based on the specific adaptation of the multi-phase separator device a larger settling zone between the multi-phase separator devices can be foregone. The flow of the suspension is equalized in these settling zones in order to ensure the efficiency of the upper multi-phase separator device. However, this also causes a loss of tank volume which could be provided for the actual conversion process.

The reactor according to the present invention further makes it possible that at least one multi-phase separator device, for example the upper, or the uppermost multi-phase separator device, covers only part of the reactor cross section, thereby rendering the production less costly.

At least one lower, for example the lowest multi-phase separator device should be in the embodiment of a three-phase separator device which includes a system of gas hoods and may also include guide elements.

This three-phase separator device is intended to capture the rising gas with as large as possible free hydraulic pass-through surfaces and to direct it into gas collection devices from where it can be discharged. For this purpose the guide elements should be arranged beneath the spaces between adjacent gas hoods.

For separation of biomass and water it is therefore sufficient that at least one upper, for example the uppermost multi-phase separator device is in the embodiment of merely a two-phase separator device which provides an as large as possible clarification surface.

In one embodiment of the reactor according to the present invention, this two-phase separator device consists exclusively or at least substantially of guide elements. These guide elements are for example in the embodiment of lamellas of a lamella separator. In order to save space the lamella separator should be designed to have a very low construction height. The lamella separator may be in the embodiment of plates or in the embodiment of polygonal elements which fit into each other.

According to the requirements and factual conditions the guide elements may be arranged across the entire cross section of the reactor vessel, or only over a central partial cross section of the reactor vessel.

If the lamella separator is smaller than the reactor cross section, it should be designed so that optimum separation of the biomass occurs at respectively prevailing hydraulic conditions. In this case rising gas entering the lamella separator must be avoided through suitable measures—in particular through gas removal elements which are arranged under the guide elements.

In particular, if the lamella separator is smaller than the reactor cross section, but also in general, a gas impervious collection chamber should be located in the upper part of the reactor vessel which is connected with a gas removal line, so that rising biogas is captured securely in the gas system.

At least one drain should be provided above the uppermost multi-phase separator device to discharge the purified water.

Based on a well-designed upper two-phase separator device the anaerobic reactor can generally be operated at higher rates of ascent than a conventional reactor.

So that the sedimentation process is not impaired by possibly present residual biogas, a zone can be created before the actual multi-phase separator devices in which the suspension is subjected to higher shearing forces. In this zone, biogas still adhering to the biomass is sheared off so that the sedimentation characteristics in the granular biomass are improved. This can occur for example through locally increased flow rates, frequent rerouting or baffles in the process water flow. The multi-phase separator devices are hereby configured so that descending granular biomass is returned into the process.

Since with this concept a settling zone may turn out much shorter it is also possible to combine upper and lower multi-phase separator devices with each other, thereby saving construction costs.

Alternatively or in addition, at least one drain in the upper region of the reactor vessel may be part of the upper, for example the uppermost multi-phase separator device. This allows for purified water to be pumped off through a screen of the drain, whereby the screen is intended to keep back light biomass. The screen can hereby be equipped with cleaning devices which, at the same time generate necessary impulses in order to shear the gas off the granular biomass. The driving energy could hereby be generated by the available geodetic.

An alternative to this is the deposition of biomass and water and the separation in a light centrifugal field. However, the hereby occurring shearing forces may not be so high as to damage the bio-sludge. In this centrifugal field separated gas would migrate into the center. Biomass would be separated with the heavy fraction and could be returned into the process.

The geodetic height of the reactor is also sufficient as the driving gradient for a separator of this type.

In most applications it is sufficient if the reactor is equipped with only two multi-phase separator devices, thus limiting expenditure. If required however, the number of separator devices can certainly be increased.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein:

FIGS. 5 through 8: various upper multi-phase devices 6.

Corresponding reference characters indicate corresponding parts throughout the several views. The exemplifications set out herein illustrate embodiments of the invention and such exemplifications are not to be construed as limiting the scope of the invention in any manner.

DETAILED DESCRIPTION OF THE INVENTION

Figure 1:
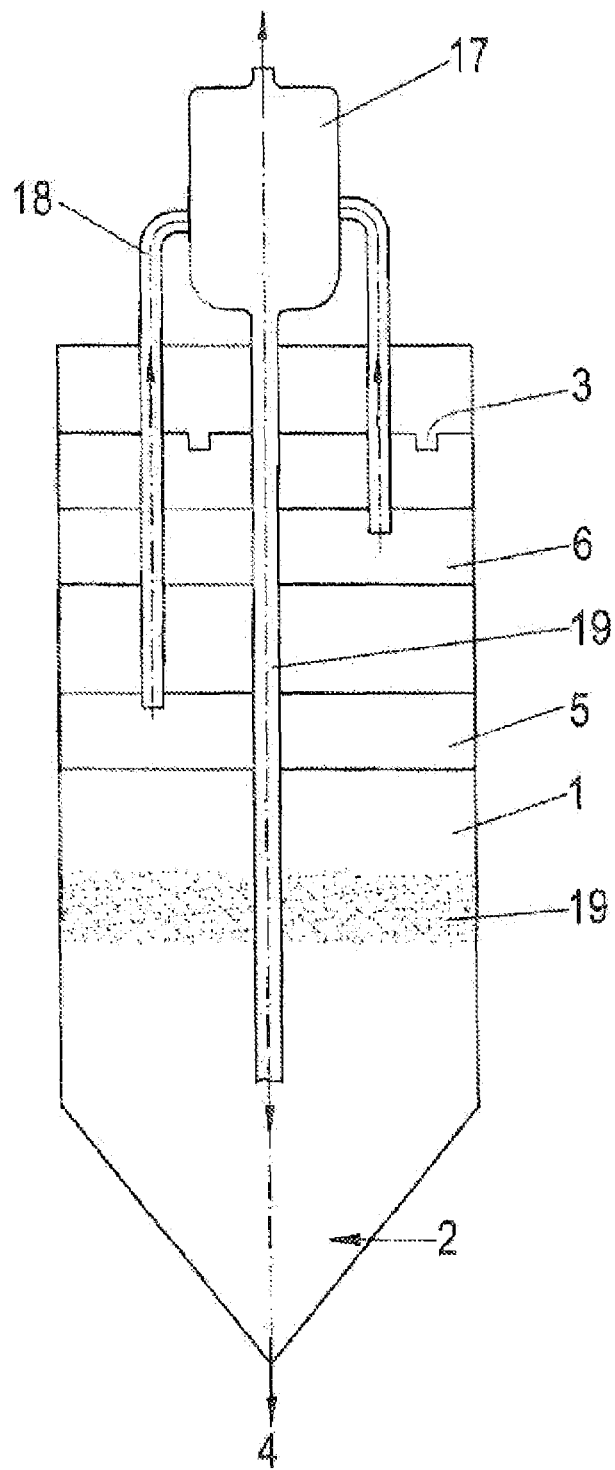
FIG. 1: schematic longitudinal section through a reactor.

Referring now to the drawings, and more particularly to FIG. 1, there is shown a bioreactor including a reactor vessel which is cylindrical in its center and upper region and which tapers conically downward in its lower region. Supply distribution system 2 to feed waste water 1 to be purified is located in the lower region, in other words in the funnel of the reactor. Two multi-phase separator devices 5, 6 are located in the center and upper reactor vessel. Separator devices 5, 6 may each include several gas hoods 7 or even several layers of gas hoods 7. Drains 3 are located above upper multi-phase separator device 6, each in the embodiment of an overflow through which the purified water is drawn from the reactor.

Gas separator device 17 is arranged on the reactor which is connected via pipes 18 with two multi-phase separator devices 5, 6. In addition, drain pipe 19 leads from the bottom of gas separator device 17 into the lower region of the reactor vessel. Moreover, sediment drain 4 is located in the lower region of the reactor vessel, more precisely in the lower region of the funnel, whereby solids or respectively a suspension consisting of solids and liquid can be drawn from the reactor vessel via sediment drain 4, and liquid for flushing of the lower reactor vessel region can be furnished through supply pipe 2.

The inlet distribution system is formed by a multitude of inlets 2 which are arranged uniformly on the bottom of the reactor vessel—in this example on the inside wall of the funnel and which transport waste water 1 to be purified into the reactor vessel. A high number of controllable inlet pipes 2 hereby permit adjustment of the distribution of supplied waste water 1 on the bottom of the reactor vessel.

During operation of the reactor, waste water 1 to be purified is fed into reactor vessel through inlets 2, whereby homogeneous mixing occurs between added waste water l and the medium in the reactor which consists of already partially purified waste water 1, micro-organism pellets and small gas bubbles.

Furnished waste water 1 flows from inlets 2 slowly upward in the reactor vessel until it reaches fermentation zone 19 containing the micro-organism containing sludge pellets. The micro-organisms contained in the pellets decompose the organic contaminates contained in waste water 1, predominantly to methane and carbon dioxide gas. Due to the produced gases, gas bubbles occur, the larger of which detach themselves from the pellets and bubble through the medium in the form of gas bubbles, whereas the smaller gas bubbles remain adhered to the sludge pellets. The pellets on which small gas bubbles adhere and which, therefore, have a lower specific weight than the other pellets and the water, rise in the reactor vessel until they reach lower multi-phase separator device 5.

The free gas bubbles collect in gas hoods 7 and form a gas cushion below the top of gas hoods 7. A flotation layer consisting of micro-organism pellets and small gas bubbles adhering thereto forms immediately below the gas cushion.

The gas accumulated in gas hoods 7, as well pellets and water are discharged for example from gas hoods 7 through an opening which is not illustrated and which is located on the face side of gas hoods 7, and if necessary are mixed in a mixing chamber which is also not illustrated and are fed into gas separator device 17 through pipe 18.

The water, the rising micro-organism pellets and the gas bubbles which were not already separated in lower multi-phase separator device 5 rise further in the reactor vessel to upper multi-phase separator device 6. Due to the decrease of the hydrostatic pressure between lower separator device 5 and upper separator device 6, the remaining small gas bubbles detach from the micro-organism pellets which got into upper multi-phase separator device 6, so that the specific weight of the pellets increases again and the pellets sink downward.

The remaining gas bubbles are captured in potentially provided gas hoods 7 of upper multi-phase separator device 6 and are again transferred into a gas collecting pipe on the face sides of individual gas hoods 7, from where the gas is fed into gas separator device 17 via pipe 18. If no gas hoods 7 are provided the gas can be captured in gas-tight gas collection chamber 15 in the upper region of the reactor vessel which is connected with a gas removal pipe.

The now purified water rises from upper multi-phase separator device 6 further upwards, until it is drawn by the overflows from the reactor vessel and is removed through outlet pipe 3.

In gas separator device 17 the gas separates from the remaining water and the micro-organism pellets, whereby the suspension consisting of pellets and the waste water recirculates through drain pipe 19 into the reactor vessel. The outlet opening of drain pipe 19 hereby feeds into the lower section of the reactor vessel where the re-circulated suspension of pellets and waste water is mixed with waste water 1 which is fed to the reactor through inlets 2, after which the cycle begins again.

Depending on the origin of waste water 1 furnished to the reactor through inlets 2, the waste water has greater or lesser solids content. Waste water from the paper industry for example contains significant concentrations of solid filler materials and lime.

After the solids-containing waste water 1 has left inlets 2 it rises upward into the cylindrical reactor vessel section. The portion of solids contained in waste water 1 which exceeds a minimum of specific density, descends already after leaving inlets 2 into the downward tapering funnel where it accumulates.

Moreover, a portion of the lime contained in waste water 1 crystallizes on the sludge pellets which in this respect act as crystallizing centers, after the waste water has risen in the sludge bed zone. Thus, a portion of the sludge pellets exceeds a critical specific density and therefore descends from the sludge bed and also accumulates in the funnel.

The sediment accumulating in the tip of the reactor vessel can be removed from the reactor continuously, or in batches as required, through sediment drain 4.

In order to improve the efficiency of the waste water treatment, but also to minimize the production costs, multi-phase separator devices 5, 6 are adapted to their particular functions. Essentially this means that the lower multi-phase separator device is optimized primarily to capture gas and the upper one ensures that residual granular sludge can be securely removed through them from the clean water. Lower multi-phase separator device 5 is therefore designed as a three-phase separator device and upper device 6 only as a two-phase separator device.

Figure 2:
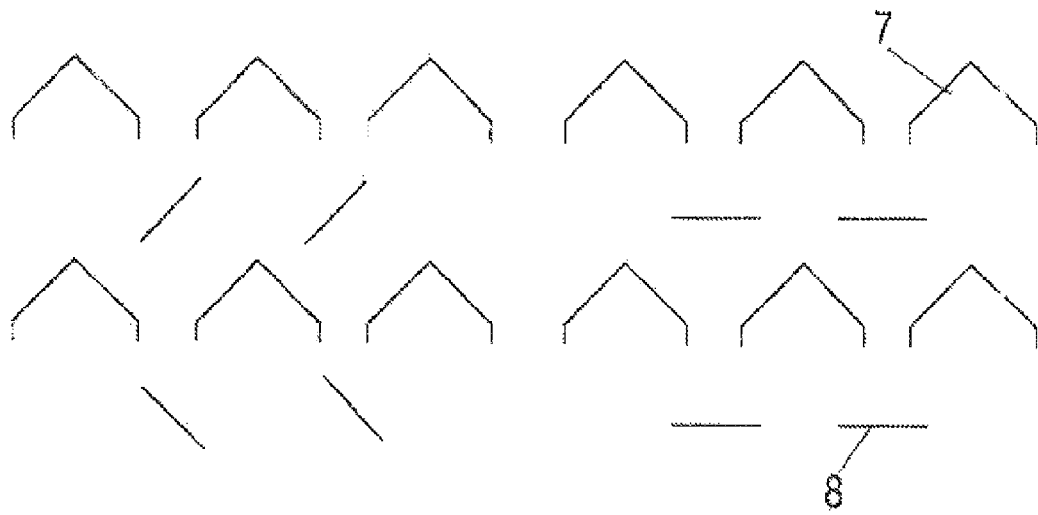
FIGS. 2 through 4: various lower multi-phase separator devices 5.
Figure 3:
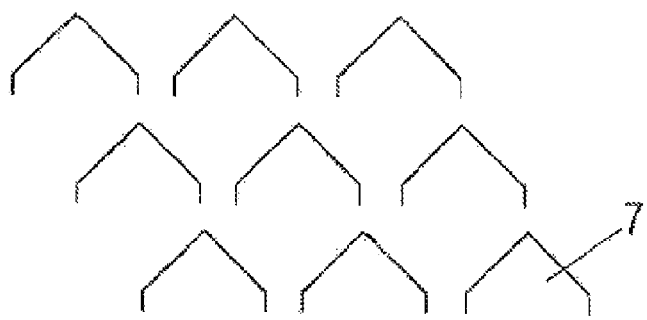
Figure 4:
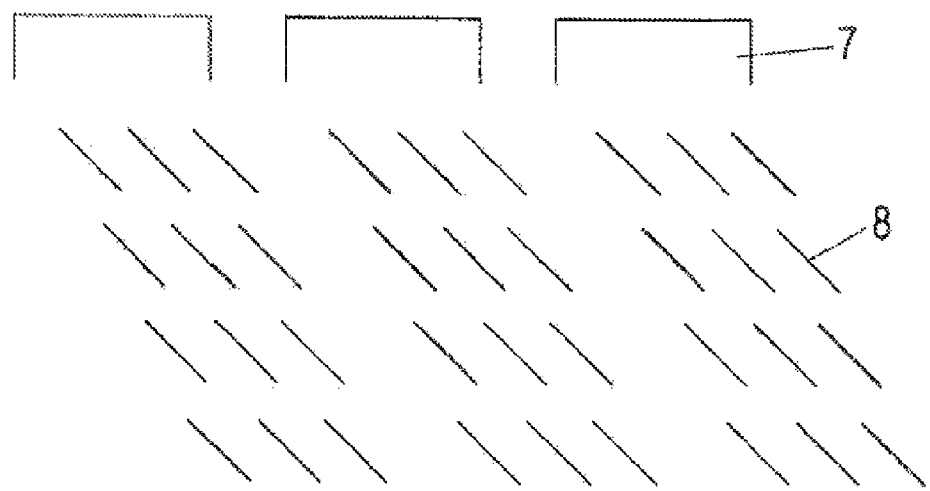

Referring now to FIGS. 2 through 4, there are shown variations of lower three-phase separator device 5 extending over the entire reactor cross section have in common that each is equipped with several adjacently arranged gas hoods 7. In FIGS. 2 and 3 several layers of gas hoods 7 which are arranged on top of one another are intended to capture and remove as much gas as possible.

In the embodiment illustrated in FIG. 2 gas hoods 7 of the layers arranged on top of one another are also positioned substantially above each other. Below and between gas hoods 7, horizontally and diagonally progressing guide elements 8 are located which are intended to direct the gas bubbles to gas hoods 7 positioned above. In contrast, gas hoods 7 of the layers which are arranged on top of one another are offset relative to each other so that potentially one gas hood 7 of an upper layer is located above the space between two or several gas hood 7 of a layer which is arranged below the upper layer. This makes it possible to dispense with guide elements 8.

Referring now to FIG. 4, there is illustrated an embodiment of the reactor according to the present invention having one layer of gas hoods 7, as well as several layers beneath it of adjacently arranged guide elements 8. Guide elements 8 progress diagonally and direct the gas bubbles to gas hoods 7. Due to this multitude of guide elements 8, shearing forces have an increased effect on the pellets which facilitates detachment of the gas bubbles from the pellets. The variations illustrated here can also be combined without problems.

Figure 5:
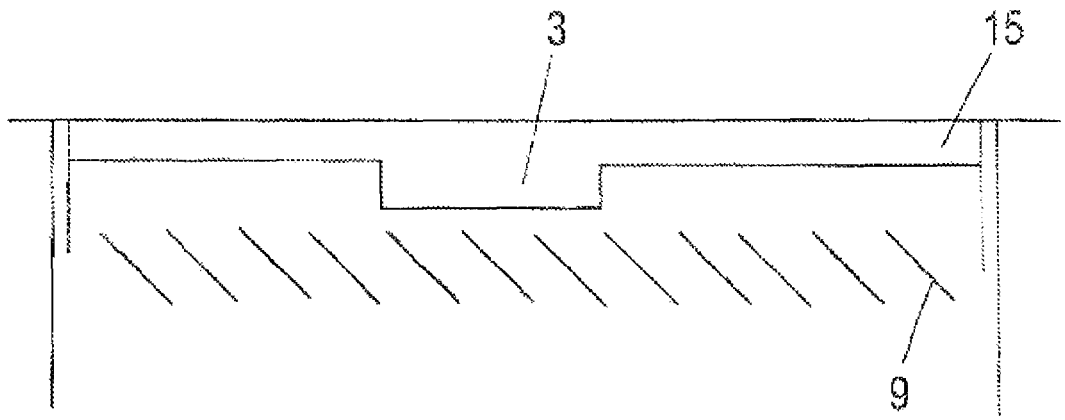
Figure 6:
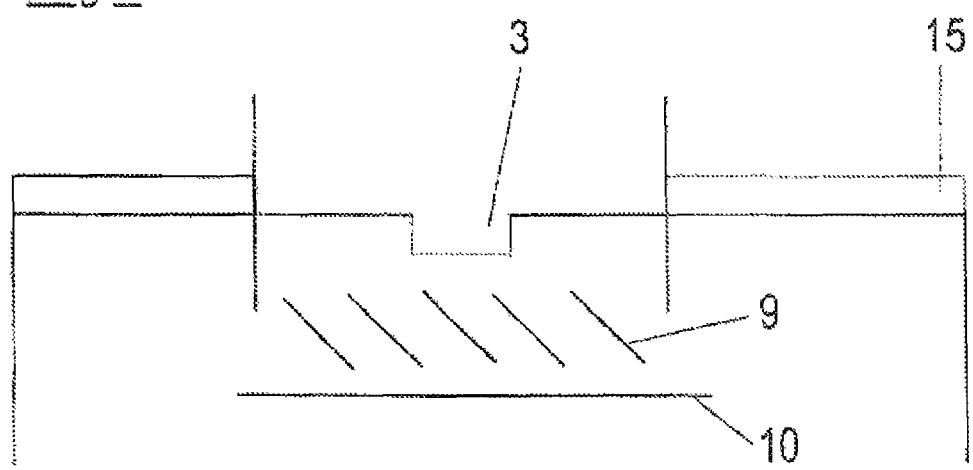

Referring now to FIGS. 5 and 6, there is shown upper two-phase separator device 6 above which the overflow with drain 3 for the purified waste water is located. In both cases separator device 6 which is to separate the solids from the water is formed by guide elements 9 in the embodiment of lamellas of a lamella separator. In FIG. 5 this separator extends over the entire reactor cross section and in FIG. 6 only over a central part of the reactor cross section. The selection is made according to the conditions, in particular the level of the gas yield in this region. In FIG. 5 the entire upper region of the reactor vessel, in other words above the overflow is utilized as a gas collection chamber 15 from where the gas is removed through a pipe.

In contrast hereto embodiment illustrated in FIG. 6, gas removal element 10 in the embodiment of a horizontal plate extending over the entire lamella separator is located underneath guide elements 9. Gas removal element 10 herein directs rising gas into the peripheral regions of the reactor cross section above which gas-tight gas collection chamber 15 is located.

Referring now to FIGS. 7 and 8, there is shown upper two-phase separator device 6 of a different kind. In FIG. 7, drain 16 leads from the upper region of the reactor into separator vessel 12 in which the filling height is substantially below the inlet of drain 16, whereby the upper region of separator vessel 12 is connected with gas removal pipe 13, whereby the lowest part leads with pipe 14 for the return of the biomass into the lower region of the reactor and whereby drain 3 for the purified water is located between biomass-pipe 14 and the filling height. The return of the biomass through biomass-pipe 14 should be supported through conveying means, in this case a pump.

Due to the gravitational force, intensified by the drop height, separation of biomass and water occurs, making possible their separate removal. The hereby separated gas emigrates substantially upwards from where it can be removed.

The geodetic height of the reactor is also sufficient as the driving gradient for a separator of this type.

Referring now to FIG. 8, there is shown the purified water is pumped off through screen 11 of drain 3, whereby screen 11 is intended to hold back light biomass. The screen can hereby be provided with cleaning devices which simultaneously produce necessary impulses to shear gas from the granular biomass. The driving energy could hereby be generated by the available geodetic.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A reactor for anaerobic purification of waste water, the reactor comprising:
   a reactor vessel having:
      at least one inlet for supplying waste water to be purified into the reactor;
      at least one outlet for discharging purified water;
      at least one sediment drain; and
      at least two differently configured multi-phase separator devices arranged on top of one another, an upper of said at least two multi-phase separator devices including a drain for discharging purified water leading into an upper region of the reactor vessel;
   a gas removal pipe;
   a biomass-pipe for returning biomass into a lower region of the reactor; and
   a separator vessel having a filling height substantially below an inlet of said drain from said upper multi-phase reactor, wherein an upper region of said separator vessel being connected with said gas removal pipe and a lowest part of said separator vessel leads into said biomass pipe, said drain for discharging purified water being located between said biomass pipe and said filling height.

2. The reactor according to claim 1, wherein the reactor is configured for anaerobic purification of waste water from a paper industry.

3. The reactor according to claim 1, wherein a lower multi-phase separator device of said at least two multi-phase separator devices is a three-phase separator device.

4. The reactor according to claim 3, wherein said lower multi-phase separator device is a lowest multi-phase separator device of said at least two multi-phase separator devices.

5. The reactor according to claim 4, wherein said lower multi-phase separator device includes a plurality of gas hoods.

6. The reactor according to claim 5, wherein said lowest multi-phase separator device includes said plurality of gas hoods.

7. The reactor according to claim 6, wherein said lower multi-phase separator device includes a plurality of guide elements.

8. The reactor according to claim 7, wherein said lowest multi-phase separator device includes said plurality of guide elements.

9. The reactor according to claim 8, wherein said plurality of guide elements are arranged beneath a plurality of spaces between said plurality of gas hoods positioned adjacent one another.

10. The reactor according to claim 1, wherein an upper multi-phase separator device of said at least two multi-phase separator devices is a two-phase separator device.

11. The reactor according to claim 10, wherein said upper multi-phase separator device is an uppermost multi-phase separator device of said at least two multi-phase separator devices.

12. The reactor according to claim 11, wherein said upper multi-phase separator device is formed by a plurality of guide elements.

13. The reactor according to claim 12, wherein said uppermost multi-phase separator device is formed by said plurality of guide elements.

14. The reactor according to claim 13, wherein said plurality of guide elements are a plurality of lamellas of a lamella separator.

15. The reactor according to claim 14, wherein said plurality of guide elements are arranged across an entire cross section of said reactor vessel.

16. The reactor according to claim 14, wherein said plurality of guide elements are arranged only across a partial cross section of said reactor vessel.

17. The reactor according to claim 16, wherein said plurality of guide elements are arranged across a central partial cross section of said reactor vessel.

18. The reactor according to claim 14, wherein a plurality of gas removal elements are arranged under said plurality of guide elements.

19. The reactor according to claim 11, wherein said drain is provided above said uppermost multi-phase separator device for discharging said purified water.

20. The reactor according to claim 19, wherein said drain is part of said uppermost multi-phase separator device and is in said upper region of said reactor vessel.

21. The reactor according to claim 20, wherein said drain includes a screen for pumping said purified water through.

22. The reactor according to claim 21, further comprising a gas collection chamber connected with a gas removal pipe located in said upper region of said reactor vessel.

23. The reactor according to claim 1, wherein said at least two multi-phase separator devices is only two multi-phase separator devices.

24. The reactor according to claim 11, wherein at least one of said at least two multi-phase separator devices covers only a part of a cross section of the reactor.

25. The reactor according to claim 24, wherein said at least one of said at least two multi-phase separator devices is said upper multi-phase separator device.

26. The reactor according to claim 25, wherein said at least one of said at least two multi-phase separator devices is said uppermost multi-phase separator device.

* * * * *